3,328,421
3-PHENYLPYRROLE DERIVATIVES
Suminori Umio, Kawani-shi, Kazuo Kariyone, Kyoto, and Kunihiko Tanaka, Osaka, Japan, assignors to Fujisawa Pharmaceutical Co., Ltd., Osaka, Japan, a company of Japan
No Drawing. Filed July 1, 1965, Ser. No. 468,970
Claims priority, application Japan, July 9, 1964, 39/39,595; Oct. 13, 1964, 39/58,439; Nov. 27, 1964, 39/66,846, 39/66,847; Dec. 15, 1964, 39/70,654
9 Claims. (Cl. 260—326.3)

This invention relates to novel compounds and to process for preparing the same. More particularly, this invention is concerned with 3-phenylpyrrole derivatives of the general formula (I):

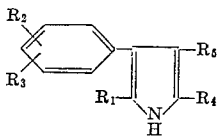

wherein $R_1$ is hydrogen or lower alkyl, $R_2$ is hydrogen, halogen or nitro, $R_3$ is halogen or nitro, $R_4$ is lower alkyl, and $R_5$ is carboxyl, ester of carboxylic acid or lower alkanoyl.

It is an object of this invention to provide novel and useful compounds which are especially important as key intermediates in the preparation of 3-phenylpyrrole derivatives, e.g. 3-(2-nitro-3-chlorophenyl)-4-chloropyrrole, and further which are also important as anti-microbial agent themselves. 3-(2-nitro-3-chlorophenyl) - 4 - chloropyrrole is an antibiotic substance produced by the fermentation method using a *Pseudomonas* strain and possesses high anti-microbial activity against fungi, particularly *Trichophyton* and weak activity against gram-positive bacteria.

It is also an object to provide processes for preparing the 3-phenylpyrrole derivatives (I) mentioned above.

3-phenylpyrrole derivatives (I) may be prepared by reacting α-aminoketones having the general formula (II):

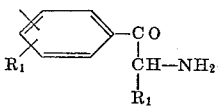

wherein $R_1$, $R_2$ and $R_3$ are the same as described above, or its salts, with carbonyl compounds having the general formula (III):

wherein $R_4$ is lower alkyl, and $R_5'$ is lower alkanoyl or ester of carboxylic acid, or its alkali metal salts, and if needed, by hydrolyzing the reaction product.

The mechanism of the reaction can be represented as follows:

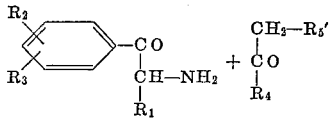

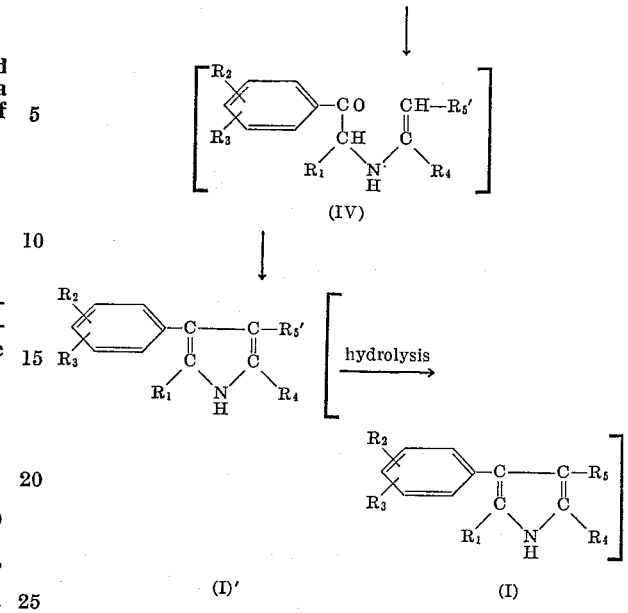

wherein $R_{1-5}$ and $R_5'$ are the same as described above.

α-Aminoketones (II) as a starting material may be prepared according to various methods known in the arts, for example, 2-amino-2'-nitro-3'-chloroacetophenone can be prepared by Neber rearrangement of 2'-nitro-3'-chloroacetophenone oxime obtained by the reaction of 2'-nitro-3'-chloro-acetophenone with hydroxylamine.

Some examples of ketone parts α-aminoketones (II) are alkanophenones such as acetophenone, propiophenone, butyrophenone, valerophenone or hexanophenone in which their phenyl radicals are substituted by one or both of nitro and halogen such as chlorine, bromine, iodine, etc. Also among carbonyl compounds (III) may be mentioned acetylacetone, propionoylacetone, butyrylacetone or valerylacetone; the alkyl or aralkyl ester of acetoacetic acid, propionylacetic acid, butyrylacetic acid or valerylacetic acid, and so forth. And some examples of the alkyl or aralkyl ester mentioned above are methyl ester, ethyl ester, propyl ester, butyl ester, benzyl ester or phenethyl ester, etc. Furthermore, some examples of the alkali metal salts of carbonyl compounds (III) are the salt with sodium, potassium, etc.

The reaction of α-aminoketones (II) with carbonyl compounds (III) is generally carried out in a buffer solution. α-Aminoketones (II) are usually used in the form of the salts with hydrochloric acid, hydrobromic acid, sulfuric acid or picric acid, etc. In case of using the salts of α-aminoketones (II), the reaction is preferably feasible after adjusting the reaction mixture to a desired pH.

The pH value in this reaction influences the yield of 3-phenylpyrrole derivatives of the object compound. The suitable pH value varies according to the position and kind of a substituent in phenyl radical of α-aminoketones (II), but may be about 3.5–6.5 in case of the presence of nitro group in said phenyl and about 4.0–7.0 in case of the absence of nitro group. The buffer solution to be used in this reaction may suitably be selected from ones known in the arts which are capable to indicate the desired pH. A few examples of the buffer solution are aqueous or substantially non-aqueous solution containing acetic acid and one of sodium acetate, sodium hydroxide, dimethyl formamide or triethylamine, and so forth. This buffer solution can act as a solvent. Furthermore, water, lower fatty acid, lower alcohol, etc., and the mixture thereof may be used as a solvent.

The reaction temperature and time are not particularly limited, being preferably about at 50–110° C. and for 5–10 hours. And the reaction may be carried out at a low temperature, e.g., 15–30° C. for a long time as 2–4 days in accordance with a kind of the starting materials (II) and (III). If the reaction is carried out at a low temperature in a short time, a compound (IV) may be obtained in crystalline form as an intermediate. In such case, the object compound can easily be obtained by treating the compound (IV) in a buffer solution mentioned above or in the presence of a condensing agent as ethyl polyphosphate.

If needed, the object compound wherein $R_5'$ is ester of carboxylic acid can be converted, by hydrolysis, to the corresponding compound wherein $R_5$ is carboxyl. Strong acid such as conc. sulfuric acid is preferable as a hydrolyzing agent, though the hydrolysis of pyrrolecarboxylate is usually carried out with alkali.

The following examples illustrate the invention without, however, limiting the same thereto.

*Example 1*

(i) 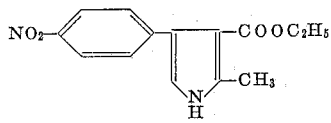

2-amino-4'-nitroacetophenone hydrochloride (1.8 g.), 1.8 g. of sodium acetate (tri-hydrate) and 1.2 g. of ethyl acetoacetate were dissolved into the solution of 8.0 cc. of acetic acid and 1 cc. of water. Then, this mixture was stirred at 70° C. for 5 hours, after which the reaction mixture was poured into ice-water.

Separated crystals were collected by filtration and recrystallized from 99% ethanol to obtain 1.1 g. of ethyl 3-(4-nitrophenyl) - 5 - methylpyrrole - 4 - carboxylate as brownish yellow scales having M.P. 165° C.

*Analysis.*—Calculated for $C_{14}H_{14}O_4N_2$: C, 61.31; H, 5.15; N, 10.21. Found: C, 61.06; H, 5.44; N, 10.21.

(ii) 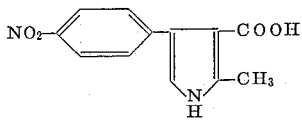

Ethyl 3-(4-nitrophenyl)-5-methylpyrrole-4-carboxylate (1.0 g.) thus obtained was floated on 2.0 cc. of concentrated sulfuric acid and warmed at 35° C. for 7 hours. The reaction mixture was poured onto 20 g. of ice-cakes and separated crystals were collected by filtration. These crystals were added into aqueous potassium hydrogen carbonate to remove impurities off. This solution was acidified with 10% sulfuric acid and separated crystals were collected by filtration to obtain 0.5 g. of 3-(4-nitrophenyl)-5-methylpyrrole-4-carboxylic acid.

IR Spectrum:
$\nu$NH (pyrrole nucleus): 3350 cm.$^{-1}$
$\nu$CO (carboxyl): 1670 cm.$^{-1}$
$\nu$NO (nitro): 1500, 1340 cm.$^{-1}$

*Example 2*

(i) 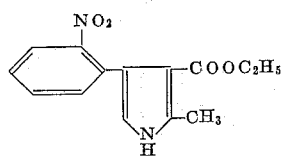

2-amino-2'-nitroacetophenone hydrochloride (0.3 g.), 0.3 g. of sodium acetate (tri-hydrate) and 0.2 g. of ethyl acetoacetate were dissolved into the solution of 1.5 cc. of acetic acid and 0.2 cc. of water, and then treated in the same manner as described in the Example 1–(i) to obtain 0.2 g. of ethyl 3-(2-nitrophenyl)-5-methylpyrrole-4-carboxylate having M.P. 159° C.

*Analysis.*—Calculated for $C_{14}H_{14}O_4N_2$: C, 61.31; H, 5.15; N, 10.21. Found: C, 61.07; H, 5.34; N, 10.40.

(ii) 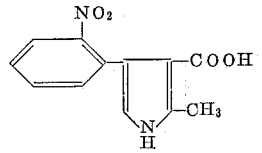

Ethyl 3-(2-nitrophenyl) - 5 - methylpyrrole carboxylate (1.0 g.) thus obtained was floated on 2.0 cc. of concentrated sulfuric acid and warmed at 35° C. for 7 hours. The reaction mixture was treated in the same manner as described in the Example 1–(ii) to obtain 3-(2-nitrophenyl)-5-methylpyrrole-4-carboxylic acid.

IR Spectrum:
$\nu$NH (pyrrole nucleus): 3370 cm.$^{-1}$
$\nu$CO (carboxyl): 1650 cm.$^{-1}$
$\nu$NO (nitro): 1530, 1340 cm.$^{-1}$

*Example 3*

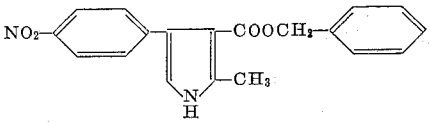

2-amino-4'-nitroacetophenone hydrochloride (0.5 g.), 0.5 g. of sodium acetate (tri-hydrate) and 0.5 g. of benzyl acetoacetate were added to 2.5 cc. of 80% acetic acid, and this mixture was stirred at 70° C. for 5 hours. After cooling, separated crystals were collected by filtration. These crystals were recrystallized from 80% acetic acid to obtain 0.6 g. of benzyl 3-(4-nitrophenyl)-5-methylpyrrole-4-carboxylate as yellowish brown granules having M.P. 140° C.

*Analysis.*—Calculated for $C_{19}H_{16}O_4N_2$: C, 67.85; H, 4.80; N, 8.33. Found: C, 67.70; H, 4.87; N, 8.14.

*Example 4*

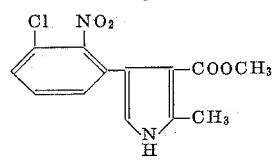

2-amino-2'-nitro-3' - chloroacetophenone hydrochloride (20.0 g.), 250 g. of sodium acetate (tri-hydrate) and 20.0 g. of methyl acetoacetate were dissolved into 400 cc. of glacial acetic acid. The mixture was warmed at 50° C. for 3 hours and then at 75° C. for 3 hours under stirring, after which the reaction mixture was poured into ice-water.

Separated precipitates were collected by filtration, dried and recrystallized from benzene to obtain 8.0 g. of methyl 3-(2-nitro - 3 - chlorophenyl)-5-methylpyrrole carboxylate as faint yellow granules having M.P. 184–186° C.

*Analysis.*—Calculated for $C_{13}H_{11}O_4N_2Cl$: C, 52.98; H, 3.76; N, 9.51; Cl, 12.03. Found: C, 52.90; H, 3.97; N, 9.22; Cl, 12.27.

*Example 5*

(i) 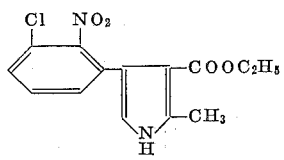

2-amino-2'-nitro-3' - chloroacetophenone hydrochloride (20.0 g.), 250 g. of sodium acetate (tri-hydrate) and 20.0 g. of ethyl acetoacetate were dissolved into 400 cc. of glacial acetic acid. Hereinafter, the mixture was treated in the same manner as described in Example 4 to obtain 10.0 g. of ethyl 3-(2-nitro-3-chlorophenyl)-5-methylpyrrole-4-carboxylate as faint yellow granules having M.P. 188° C.

*Analysis.*—Calculated for $C_{14}H_{13}O_4N_2Cl$: C, 54.46; H, 4.24; N, 9.08. Found: C, 54.25; H, 4.11; N, 9.04.

(ii)

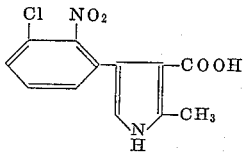

Ethyl 3 - (2 - nitro - 3 - chlorophenyl)-5-methylpyrrole-4-carboxylate (1.0 g.) thus obtained was floated on 1.0 g. of 93% sufuric acid and stirred at 35° C. for 3.5 hours. Hereinafter, the reaction mixture was treated in the same manner as described in Example 2–(ii) to obtain 0.6 g. of 3 - (2 - nitro - 3-chlorophenyl)-5-methylpyrrole-4-carboxylic acid having M.P. 215° C. (decomp.).

*Example 6*

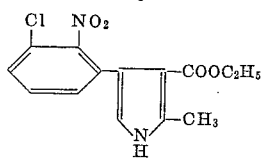

2 - amino - 2′ - nitro - 3′ - chloroacetophenone hydrochloride (2.0 g.) was dissolved at 50° C., under stirring, into the solution (pH 4.75) of 40 cc. of acetic acid and 20 cc. of triethylamine, and to this solution was added 2.0 g. of ethyl acetoacetate. The mixture was warmed at 50° C. for 2.5 hours and at 70–80° C. for 3 hours, after which the reaction mixture was poured into 70 cc. of ice-water. Separated crystals were collected by filtration, washed with water, dried and then recrystallized from benzene to obtain 0.5 g. of ethyl 3-(2-nitro-3-chlorophenyl) - 5 - methylpyrrole - 4 - carboxylate having M.P. 188° C.

*Example 7*

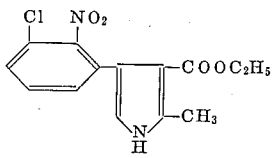

Sodium acetate (tri-hydrate) (25 g.) was dissolved into 40 cc. of acetic acid warmed at 50° C., and to this solution was added 2.0 g. of ethyl acetoacetate. To this solution, a solution of 2.0 g. of 2-amino-2′-nitro-3′-chloroacetophenone hydrochloride in 10 cc. of dimethyl-formamide was added drop by drop at 50° C. within 1.5 hours under stirring. Further, the mixture was stirred at 50° C. for an hour and then at 70° C. for 2 hours, after which the reaction mixture was poured into 60–80 cc. of ice-water. Separated crystals were collected by filtration, washed, dried and then recrystallized from benzene to obtain 0.7 g. of ethyl 3 - (2 - nitro - 3 - chlorophenyl) - 5 - methylpyrrole - 4 - carboxylate as yellow crystals having M.P. 188° C.

*Example 8*

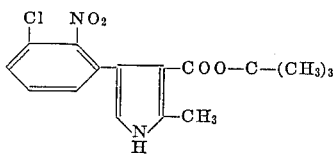

2-amino-2′-nitro-3′ - chloroacetophenone hydrochloride (20.0 g.), 250 g. of sodium acetate (tri-hydrate) and 20.0 g. of t-butyl acetoacetate were dissolved into 400 cc. of glacial acetic acid. Hereinafter, this mixture was treated in the same manner as described in Example 4 to obtain 6.0 g. of t-butyl 3 - (2 - nitro - 3 - chlorophenyl) - 5 - methylpyyrole-4-carboxylate as faint yellow needles having M.P. 167° C.

*Analysis.*—Calculated for $C_{16}H_{17}O_4N_2Cl$: C, 57.06; H, 5.09; N, 8.32. Found: C, 57.19; H, 5.36; N, 8.39.

*Example 9*

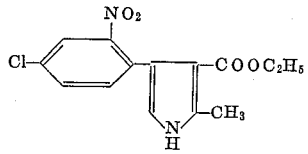

2 - amino - 2′ - nitro - 4′ - chloroacetophenone hydrochloride (1.5 g.) was dissolved in 150 cc. of 0.1 N-buffer solution (pH 4.5) of acetic acid and sodium acetate, and to this solution was added 1.5 g. of ethyl acetoacetate. This mixture was stirred at room temperature for 3 days. Separated crystals were collected by filtration, washed with water, dried and treated with active carbon to remove impurities off, after which the crystals were recrystallized from benzene to obtain 100 mg. of ethyl 3 - (2 - nitro - 4 - chlorophenyl) - 5 - methyl pyrrole-4-carboxylate having M.P. 183.5–184° C.

*Analysis.*—Calculated for $C_{14}H_{13}O_4N_2Cl$: C, 54.46; H, 4.24; N, 9.08. Found: C, 54.44; H, 4.16; N, 9.01.

*Example 10*

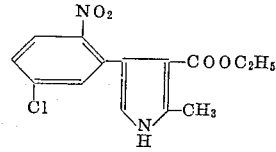

2 - amino - 2′ - nitro - 5′ - chloroacetophenone hydrochloride (1.5 g.) was dissolved into 150 cc. of 0.1 N-buffer solution (pH 4.5) of acetic acid and sodium acetate, and to this solution was added 1.5 g. of ethyl acetoacetate.

Hereinafter, the mixture was treated in the same manner described in Example 9 to obtain 50 mg. of ethyl 3 - (2 - nitro - 5 - chlorophenyl) - 5 - methylpyrrole - 4 - carboxylate having M.P. 174–175.5° C.

*Analysis.*—Calculated for $C_{14}H_{13}O_4N_2Cl$: C, 54.46; H, 4.24; N, 9.08. Found: C, 54.69; H, 4.18; N, 9.23.

*Example 11*

(i)

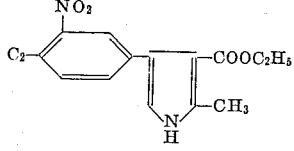

2 - amino - 3′ - nitro - 4′ - chloroacetophenone hydrochloride (20.0 g.), 250 g. of sodium acetate (tri-hydrate) and 20.0 g. of ethyl acetoacetate were dissolved into 400 cc. of glacial acetic acid. Hereinafter, the mixture was treated in the same manner as described in Example 4 to obtain 12.0 g. of ethyl 3-(3-nitro-4-chlorophenyl)-5 - methylpyyrole - 4 - carboxylate as yellow granules having M.P. 153–155° C.

*Analysis.*—Calculated for $C_{14}H_{13}O_4N_2Cl$: C, 54.46; H, 4.24; N, 9.08. Found: C, 54.60; H, 4.16; N, 8.99.

(ii)

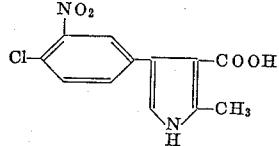

Ethyl 3 - (3 - nitro - 4 - chlorophenyl) - 5 - methylpyrrole-4-carboxylate (1.0 g.) thus obtained was floated on 2.0 cc. of concentrated sulfuric acid and warmed at 40–50° C. for 30 minutes. The reaction mixture was treated in the same manner as described in the Example 1–(ii) to obtain 0.2 g. of 3-(3-nitro-4-chlorophenyl)-5-methylpyrrole-4-carboxylic acid.

*Analysis.* — Calculated for $C_{12}H_9O_4N_2Cl$: C, 51.35; H, 3.23; N, 9.98; Cl, 12.63. Found: C, 51.21; H, 3.23; N, 9.89; Cl, 12.63.

*Example 12*

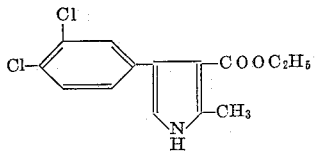

2 - amino - 3',4' - dichloroacetophenone hydrochloride (400 mg.) and 400 mg. of ethyl acetoacetate were dissolved into 50 cc. of 0.3 N buffer solution (pH 6.5) of acetic acid and sodium acetate, and the mixture was stirred at room temperature for 2 days. Separated crystals were collected by filtration. These crystals were dried and recrystallized from 99% ethanol to obtain 60 mg. of ethyl 3-(3,4-dichlorophenyl)-5-methylpyrrole-4-carboxylate as colorless needles having M.P. 154–155° C.

*Analysis.*—Calculated for $C_{14}H_{11}O_2NCl_2$: C, 56.39; H, 4.40. Found: C, 56.06; H, 4.39.

*Example 13*

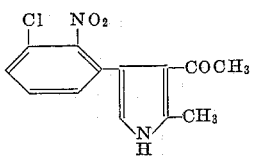

2 - amino-2' - nitro - 3' - chloroacetophenone hydrochloride (5.0 g.), 62.5 g. of sodium acetate (tri-hydrate) and 5.0 g. of acetyl acetone were dissolved into 100 cc. of acetic acid, and this solution was warmed at 50° C. for 3 hours and then at 70° C. for 3 hours. After cooling, the reaction mixture was diluted with ice-water and separated crystals were collected by filtration. These crystals were recrystallized from ethanol to obtain 1.5 g. of 3-(2-nitro - 3 - chlorophenyl) - 4 - acetyl - 5 methylpyrrole as faint yellow needles having M.P. 190° C.

*Analysis.*—Calculated for $C_{13}H_{11}O_3N_2Cl$: C, 56.02; H, 3.98; N, 10.05; Cl, 12.75. Found: C, 55.90; H, 3.87; N, 9.99. Cl, 12.48.

*Example 14*

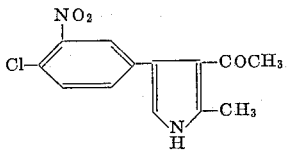

2 - amino - 3' - nitro - 4' - chloroacetophenone (500 mg.) and 500 mg. of acetyl acetone were dissolved into 0.1 N-buffer solution (pH 4.5) of acetic acid and sodium acetate, and this solution was warmed at 50–75° C. for 6 hours under stirring. After cooling, the reaction mixture was diluted with ice-water and separated crystals were collected by filtration. These crystals were recrystallized from ethyl acetate to obtain 300 mg. of 3-(3-nitro-4-chlorophenyl)-4-acetyl-5-methylpyrrole as faint yellow crystals having M.P. 197° C.

*Analysis.*—Calculated for $C_{13}H_{11}O_3N_2Cl$: C, 56.02; H, 3.98; N, 10.05. Found: C, 55.71; H, 4.02; N, 9.80.

*Example 15*

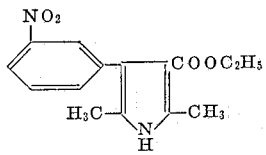

2-amino-3'-nitropropiophenone hydrochloride (2.0 g.) and 2.0 g. of ethyl acetoacetate were dissolved into 200 cc. of 0.3 N-buffer solution (pH 4.5) of acetic acid and sodium acetate. This mixture was stirred at room temperature for 3 days, after which separated crystals were collected by filtration. The crystals thus obtained were dried and then recrystallized from benzene to obtain 0.8 g. of ethyl 3-(3-nitrophenyl)-2,5-dimethylpyrrole-4-carboxylate as faint yellow prisms having M.P. 146–7° C.

*Analysis.*—Calculated for $C_{15}H_{16}N_2O_4$: C, 62.49; H, 5.59; N, 9.72. Found: C, 62.68; H, 5.71; N, 9.57.

*Example 16*

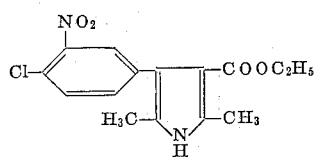

2-amino-3'-nitro-4'-chloropropiophenone hydrochloride (500 mg.) was dissolved in 0.3 N-buffer solution of acetic acid and sodium acetate, and to this solution was added 500 mg. of ethyl acetoacetate. The mixture was treated in the same manner as described in the Example 15. The crystals thus obtained were recrystallized from 95% ethanol to obtain 110 mg. of ethyl 3-(3-nitro-4-chlorophenyl)-2,5-dimethyl-4-carboxylate as faint yellow granules having M.P. 151–152° C.

*Analysis.*—Calculated for $C_{15}H_{15}O_4N_2Cl$: C, 55.82; H, 4.68; N, 8.68. Found: C, 55.70; H, 4.75; N, 8.61.

The minimum growth inhibitory concentration against *Mycobacterium* S P 609 was 10 γ/cc.

*Example 17*

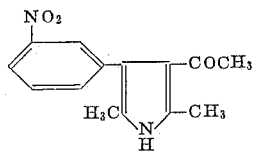

2-amino-3'-nitro-propiophenone hydrochloride (2.0 g.) was dissolved into 200 cc. of 0.3 N-buffer solution (pH 4.5) of acetic acid and sodium acetate, and to this solution was added 1.6 g. of acetyl acetone. The mixture, which was faint yellow and transparent, was stirred at room temperature for 2 days, after which separated crystals were collected by filtration to obtain 1.6 g. of crude 3 - (3 - nitrophenyl) - 4-acetyl-2,5-dimethylpyrrole. The crude crystals were recrystallized from 99% ethanol to obtain the pure crystals as faint yellow needles having M.P. 208–9° C.

*Analysis.*—Calculated for $C_{14}H_{14}O_3N_2$: C, 65.10; H, 5.46; N, 10.85. Found: C, 65.34; H, 5.41; N, 10.67.

*Example 18*

(i) 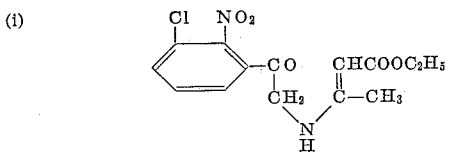

2-amino-2'-nitro-3' - chloroacetophenone hydrochloride (500 mg.) was dissolved into 75 cc. of 0.1 N-buffer solution (pH 4.5) of sodium acetate and acetic acid. To this solution was added 500 mg. of ethyl acetoacetate, and the mixture was stirred at room temperature for 1.5 hours. Separated crystals were collected by filtration and recrystallized from ethyl acetate to obtain 200 mg. of ethyl 3-(2-nitro-3-chlorobenzoylmethylamino) crotonate as colorless crystals having M.P. 156° C. (decomp.).

*Analysis.*—Calculated for C₁₄H₁₅O₅N₂Cl: C, 51.46; H, 4.63; N, 8.57. Found: C, 51.45; H, 4.59; N, 8.39.

(ii)

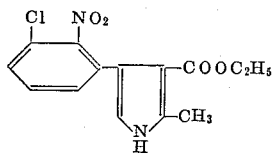

Ethyl 3-(2-nitro-3 - chlorobenzoylmethylamino) crotonate (300 mg.) thus obtained was heated with a solution of 3 cc. of acetic acid and 150 mg. of sodium acetate (trihydrate) at 90° C. for 3 hours under stirring. The reaction mixture was poured into 15 cc. of ice-water and separated precipitates were collected by filtration. These crystals were recrystallized from benzene to obtain 100 mg. of ethyl 3-(2-nitro-3-chlorophenyl)-5-methylpyrrole - 4 - carboxylate as faint yellow needles having M.P. 188° C.

(iii)

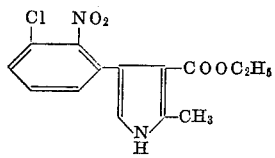

Ethyl 3-(2-nitro-3 - chlorobenzoylmethylamino) crotonate (500 mg.) was heated with 10 g. of ethyl polyphosphate at 80° C. for an hour under stirring. After cooling, the reaction mixture was poured into 100 cc. of ice-water and extracted with ethyl acetate. The extract was washed with 10% hydrochloric acid, water and aqueous sodium hydrogen carbonate solution, and then dried, after which the solution was concentrated under reduced pressure. The residue was recrystallized from benzene to obtain 150 mg. of ethyl 3-(2-nitro-3-chlorophenyl)-5 - methylpyrrole-4-carboxylate having M.P. 188° C.

*Example 19*

(i)

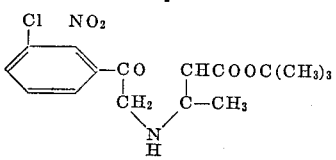

2-amino-2' - nitro-3' - chloroacetophenone hydrochloride (500 mg.) was dissolved into 0.1 N-buffer solution (pH 4.5) of sodium acetate and acetic acid, and then to this solution was added 500 mg. of t-butyl acetoacetate. Hereinafter, this mixture was treated in the same manner as described in the Example 18–(i) to obtain 130 mg. of t-butyl 3-(2-nitro-3 - chlorobenzoylmethylamino) crotonate as faint brown scale-like crystals having M.P. 150° C. (decomp.).

*Analysis.*—Calculated for C₁₆H₁₉O₅N₂Cl: C, 54.17; H, 5.40; N, 7.90. Found: C, 54.30; H, 5.68; N, 7.62.

(ii)

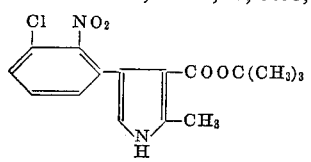

t-Butyl 3-(2-nitro-3-chlorobenzoylmethylamino) crotonate (300 mg.) thus obtained was heated with a solution of 3 cc. of acetic acid and 150 mg. of sodium acetate (trihydrate) at 90° C. for 3 hours under stirring. Hereinafter, the reaction mixture was treated in the same manner as described in the Example 18–(ii) to obtain 100 mg. of t-butyl 3-(2-nitro-3-chlorophenyl)-5-methylpyrrole-4 - carboxylate as faint yellow needles having M.P. 167° C.

*Analysis.*—Calculated for C₁₆H₁₇O₄N₂Cl: C, 57.06; H, 5.09; N, 8.32. Found: C, 57.22; H, 5.31; N, 8.43.

*Example 20*

(i)

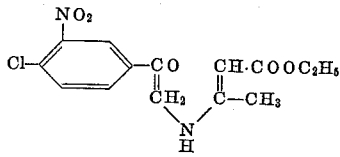

2-amino-3' - nitro-4' - chloroacetophenone hydrochloride (500 mg.) and ethyl acetoacetate (500 mg.) were treated in the same manner as described in the Example 18–(i) to obtain 200 mg. of ethyl 3-(3-nitro-4-chlorobenzoylmethylamino) crotonate as colorless flakes having M.P. 139° C. (decomp.).

*Analysis.*—Calculated for C₁₄H₁₅O₅N₂Cl: C, 51.46; H, 4.63; N, 8.57; O, 24.48; Cl, 10.86. Found: C, 51.24; H, 4.54; N, 8.54; O, 24.92; Cl, 10.56.

(ii)

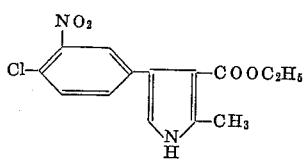

Ethyl 3-(3-nitro-4 - chlorobenzoylmethylamino) crotonate (500 mg.) thus obtained was treated in the same manner as described in the Example 18–(ii) to obtain 300 mg. of ethyl 3-(3-nitro-4-chlorophenyl)-5-methylpyrrole-4-carboxylate as faint yellow needles having M.P. 152° C.

*Analysis.*—Calculated for C₁₄H₁₃O₄N₂Cl: C, 54.46; H, 4.24; N, 9.08. Found: C, 54.39; H, 4.15; N, 9.26.

*Example 21*

(i)

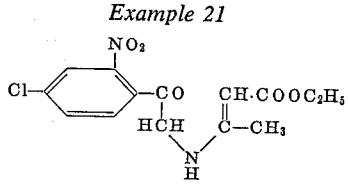

2-amino-2' - nitro-4' - chloroacetophenone hydrochloride (500 mg.) was dissolved into 0.1 N-buffer solution (pH 4.5) of sodium acetate and acetic acid and then to this solution was added 500 mg. of ethyl aceto-acetate and the mixture was stirred at room temperature for 1.5 hours. A part of separated crystals were picked up from the reaction mixture and recrystallized from ethyl acetate to obtain ethyl 3-(2-nitro-4-chlorobenzoylmethylamino) crotonate as faint yellow glass fiber-like crystals having M.P. 130° C. (decomp.).

*Analysis.*—Calculated for C₁₄H₁₅O₅N₂Cl: C, 51.46; H, 4.63; N, 8.57; Cl, 10.86. Found: C, 51.59; H, 4.80; N, 8.74; Cl, 10.63.

(ii)

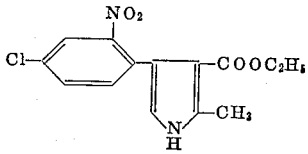

Further, the above reaction mixture was stirred under the same condition as described above for 3 days, after which separated crystals were collected by filtration.

These crystals were washed with water, dried and treated with active carbon to remove impurities off, after which the crystals were recrystallized from benzene to obtain ethyl 3-(2-nitro-4-chlorophenyl) - 5 - methylpyrrole carboxylate having M.P. 183.5–184° C.

What is claimed is:
1. A compound of the formula

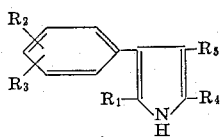

wherein $R_1$ is hydrogen or lower alkyl, $R_2$ is hydrogen, halogen or nitro, $R_3$ is halogen or nitro, $R_4$ is lower alkyl and $R_5$ is carboxyl, lower alkoxycarbonyl, phenyl lower alkoxycarbonyl or lower alkanoyl.

2. 3-(nitrophenyl)-5-methylpyrrole-4 - carboxylic acid or its lower alkyl or phenyl–lower alkyl ester.

3. 3-(phenyl disubstituted with nitro and chlorine)-5-methylpyrrole-4-carboxylic acid or its lower alkyl ester.

4. Lower alkyl ester of 3-(2-nitro-3-chlorophenyl)-5-methylpyrrole-4-carboxylic acid.

5. 3 - (nitro-3-chlorophenyl)-5-methylpyrrole - 4 - carboxylic acid.

6. 3-(phenyl disubstituted with nitro and chlorine)-4-acetyl-5-methylpyrrole.

7. 3-(dichlorophenyl)-5-methylpyrrole - 4 - carboxylic acid or its lower alkyl ester.

8. 3-(phenyl substituted with one or both of nitro and chlorine)-2,5-dimethylpyrrole - 4 - carboxylic acid or its lower alkyl ester.

9. 3-(nitrophenyl)-2,5-dimethyl-4-acetylpyrrole.

References Cited

Fieser et al., Organic Chemistry, 1956, p. 178.
Hollins, Synthesis of Nitrogen Ring Compounds, 1924, pp. 70–75.
Horsfall, Fungicides and Then Action, 1945, pp. 139–42, 151–2.
Horsfall, Principles of Fungicidal Action, 1956, p. 202.
Knorr et al., Berichte, vol. 35, pp. 3002–5, 1902.

ALEX MAZEL, *Primary Examiner.*

HENRY R. JILES, *Examiner.*

JOSEPH A. NARCAVAGE, *Assistant Examiner.*